(12) United States Patent
Ma et al.

(10) Patent No.: US 6,452,493 B1
(45) Date of Patent: Sep. 17, 2002

(54) PROCESS CONTROL INSTRUMENT WITH MULTIPLE FUNCTIONS

(75) Inventors: Xiqing Ma, Olathe; Prabhaharan Kumarakulasingam, Lawrence; John M. Donnelly, Overland Park; Arthur David Womack, Jr., Olathe; Mark Stephen Bartrum, Shawnee, all of KS (US)

(73) Assignee: SOR, Inc., Lenexa, KS (US)

( * ) Notice: Subject to any disclaimer, the term of this patent is extended or adjusted under 35 U.S.C. 154(b) by 0 days.

(21) Appl. No.: 09/487,019

(22) Filed: Jan. 19, 2000

(51) Int. Cl.[7] .................................................. G08B 1/08
(52) U.S. Cl. ....................................................... 340/533
(58) Field of Search ................................. 340/506, 507, 340/508, 514, 531, 533, 538, 310.01

(56) References Cited

U.S. PATENT DOCUMENTS 5,535,243 A * 7/1996 Voegele et al. ............. 375/259
5,705,979 A * 1/1998 Fierro et al. ................ 340/517

* cited by examiner

*Primary Examiner*—Daryl Pope
(74) *Attorney, Agent, or Firm*—Shook, Hardy & Bacon L.L.P.

(57) ABSTRACT

A process control instruments includes a sensor for sensing a process variable in a processing environment, and a switch, a gauge, and a transmitter. The sensor, switch, gauge, and transmitter, a controller to which each of the stated and related components are connected, are powered via a two-wire power loop. In particular, the two-wired power loop also comprises the transmitter, such that the controller, upon receiving information indicative of the level of a variable being sensed by the sensor, modulates the amplitude of the current on the two-wire loop to a level corresponding to the level of the processed variables sensed. Each of the switch, gauge, and transmitter are independently scalable. In the preferred embodiment of the invention, a pair of switches in the form of relays are provided, and a logic circuit operates to power the components of the invention, with the exception of the relays, when the process variable being sensed with within a selected range. When, however, the process variable being sensed dips below the lower threshold(s) or rises above an upper threshold(s), the logic circuit operates to provide power to the components of the invention through a relay corresponding to the threshold reached.

20 Claims, 2 Drawing Sheets

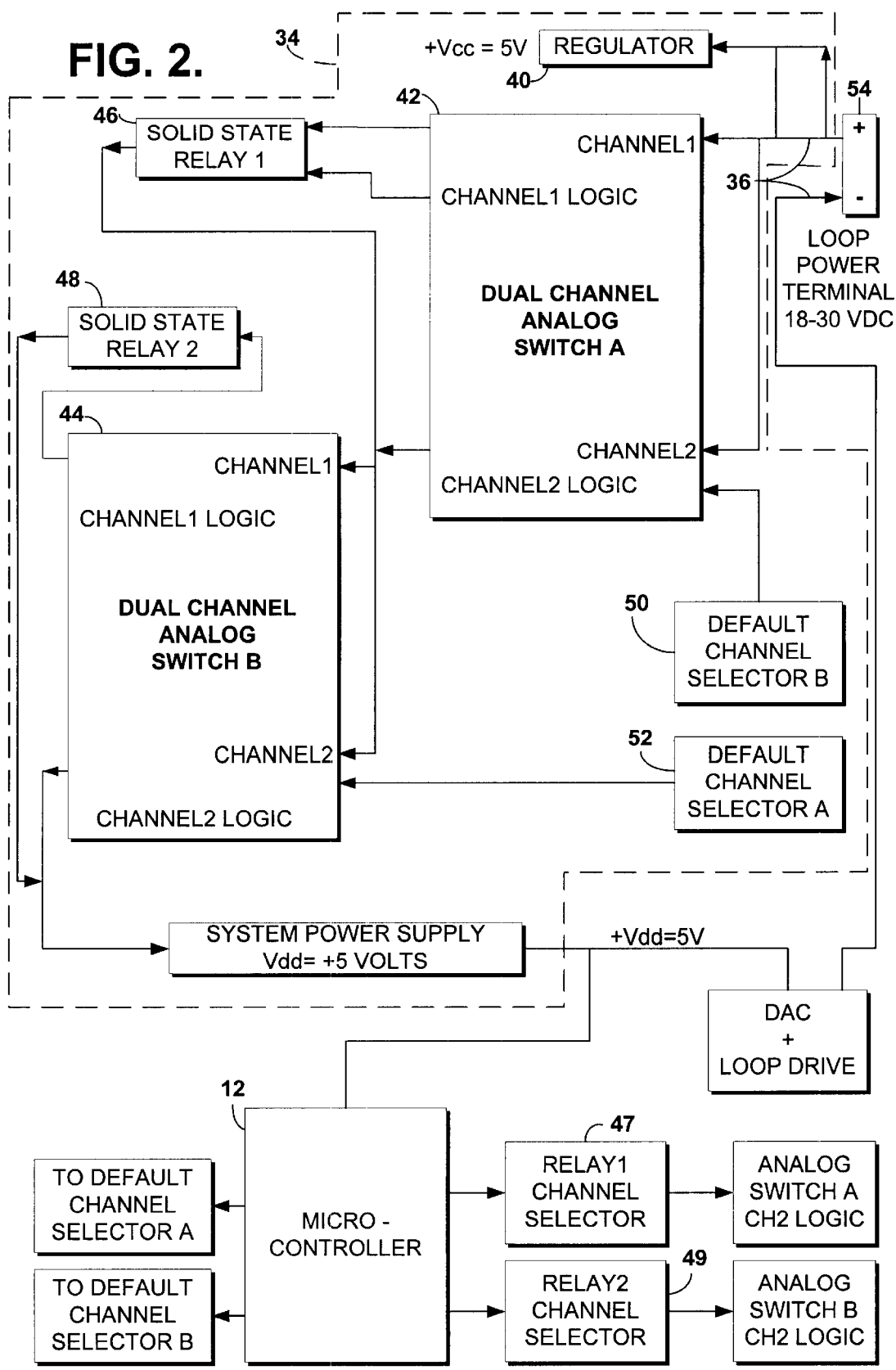

PROCESS CONTROL INSTRUMENT WITH MULTIPLE FUNCTIONS

BACKGROUND OF THE INVENTION

Field of the Invention

The present invention is generally directed to an electronic process instrument for sensing a process variable in an industrial process. More particularly, the present invention is directed to a combined sensor, switch, gauge, and transmitter for displaying (with the gauge) and transmitting (with the transmitter) a value corresponding to a condition or variable that is sensed by the sensor, and for switching the switch when a predetermined threshold value of the condition is sensed.

SUMMARY OF THE INVENTION

In one embodiment of the invention, an electronic process instrument has a sensor, for sensing a condition in an environment, and a transmitter for transmitting information indicative of that which is sensed by the sensor. In particular, the sensor is powered by a dc power supply via is a two-wire loop. In accordance with an aspect of the invention, information indicative of that which is sensed by the sensor is transmitted via the two-wire loop by modulating the amplitude of an electrical current flowing in the loop corresponding to that which is sensed by the sensor. Preferably, the electrical current flowing in the two-wire loop, and providing an indication of that which is sensed by the sensor, is between 4 and 20 milliamps when the sensor is operating. For example, when the sensor is a pressure sensor for sensing the pressure of a fluid flowing in a line, the electrical current is controlled so as to correspond to the pressure of the fluid, as sensed by the sensor.

More specifically, the present invention has a controller, such as a microprocessor. Connected to the microprocessor is the sensor for sensing a condition in an environment in which the switch is placed. As alluded to, in a preferred embodiment, the sensor is a pressure sensor for sensing the pressure of a fluid flowing in a line, although it should be understood that the sensor may be a temperature or other type of sensor. Also connected to the processor is a gauge for displaying information indicative of that which is sensed by the sensor.

The components of the invention and, particularly, the sensor, gauge, and controller, are powered by a dc power supply via a common two-wire loop. The controller receives data, from the sensor, indicative of the condition being sensed. In accordance with the invention, the controller utilizes the two-wire power supply loop to transmit information indicative of the received data. In particular, the controller controls the amplitude of the electrical current flowing on the two-wire power supply loop so that the current corresponds to the data received from the sensor. Preferably, the electrical current flowing in the two-wire loop is adjusted within the range of 4 and 20 milliamps to indicate the level of the corresponding variable sensed by the sensor.

By providing an instrument according to the present invention, numerous advantages are achieved. Among these advantages, the instrument significantly reduces the response time required to sense the process variable and transmit the output through the two wire power supply loop. Preferably, the response time is less than 30 milliseconds. Transmission through the two wire loop with built-in diagnostics is accurate and fail safe and results in longer, improved mean time before failure of the device.

Another advantage of the instrument of the present invention is that the switch or switches, gauge and transmitter are powered by a single source and are independently scalable. Thus, for instance, since the components are independent, diagnostics may be run and/or the transmission output may be programmed without affecting the gauge output or switch operation. Moreover, the switch or switches may be tested without affecting the transmission output, and likewise, testing of the transmitter may be performed without affecting the switch(es). Since the components are scalable, the process variables may be displayed or transmitted when the process variable is at a level outside the normal operating range of the device.

In addition to accomplishing these and other advantages, the device is universal and may be used in conjunction with sensors for sensing a number of process variables such as pressure, temperature, volumetric flow, level, or differential pressure or temperature. Also, the components of the device may be located in a single, compact housing placed in communication with the line or system.

BRIEF DESCRIPTION OF THE DRAWINGS

The objects and features of the invention noted above are explained in more detail with reference to the drawings, in which like reference numerals denote like elements, and in which:

FIG. 2 is a block diagram illustrating a relay driver utilized in accordance with the preferred principles of the present invention.

DETAILED DESCRIPTION OF THE INVENTION

Figure 1:
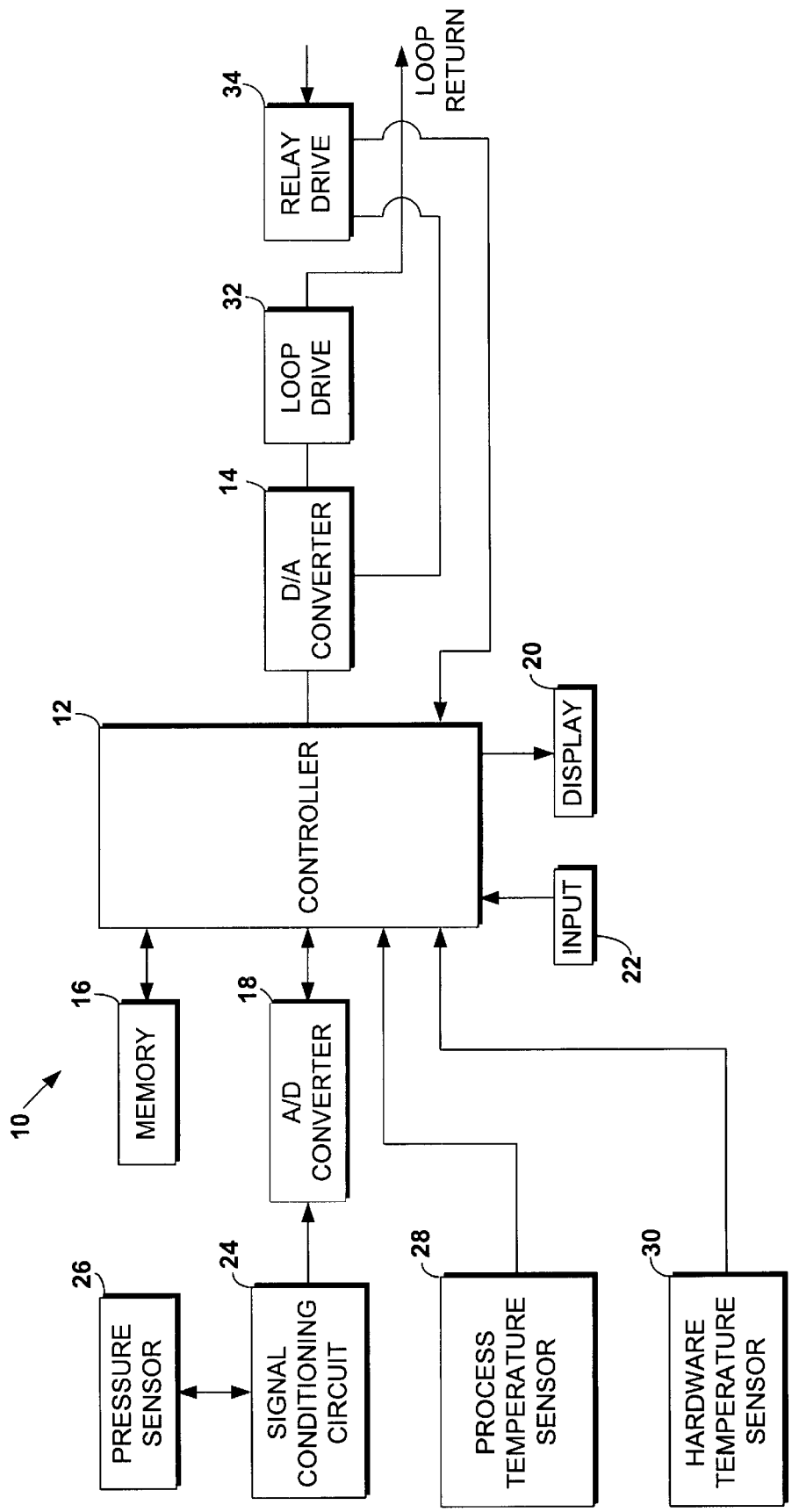
FIG. 1 is a block diagram illustrating the electronic switch-gauge-transmitter of the present invention.

With reference initially to FIG. 1, an electronic process instrument, and particularly a combined switch-gauge-transmitter device of the present invention, is denoted generally by reference numeral 10. The device 10 has a controller 12. Controller 12 is preferably a reduced institution set (RIS) microprocessor, but may be any type of processor or controller. Connected to the controller 12 are a digital-to-analog converter 14, a memory 16, an analog-to-digital converter 18, a display 20, and an input, such as a keypad input, denoted generally by reference numeral 22. As illustrated, connected to the analog-to-digital converter 18 is a signal conditioning circuit 24, which is further connected to a sensor 26, illustrated in FIG. 1 as a pressure sensor in accordance with the preferred embodiment of the present invention.

In the preferred embodiment, sensor 26 measures the pressure in a fluid flow line. It will be understood and appreciated by those with skill in the art that the fluid flow line may contain either liquid or gas, or a combination thereof, and may also comprise particulate matter. A typical pressure sensor is a Wheatstone bridge strain gage utilizing one of the group of elements including ceramic thick-film, fully welded thin film, fully welded chemical vapor deposited, foil gauge on beam, silicon on steel, silicon on sapphire and/or oil-filled piezoresistive elements. Other suitable pressure sensors include resonant-wire, variable capacitance and variable reluctance sensors.

The device of the present invention is capable of incorporating many types of sensors. Instead of pressure, a sensor may be selected to measure other conditions in the environment such as the temperature, volumetric flow, level, or differential pressure or temperature of a line or system. For instance, thermocouples, RTD sensors, thermistors and bulb and capillary sensors may be used to measure temperature. Flow may be measured by thermal dispersion, ultrasonic, Doppler-effect and positive displacement sensors. Suitable level sensors include hydrostatic pressure, radio frequency admittance, capacitance, or impedance, ultrasonic, microwave radar, thermal dispersion and magnetostrictive sensors.

In the preferred embodiment, the sensing element of the Wheatstone bridge pressure sensor 26 is affected by the temperature of the sensor and must be normalized to take an accurate reading. Temperature sensor 28 is located on or in close proximity to sensor 26 and provides the temperature of sensor 26 to controller 12. An on chip analog to digital convertor used to reads the temperature input in controller 12 accounts for the temperature effects on the sensor. Additionally, a second temperature sensor 30, indicated as a hardware temperature sensor, is also connected to controller 12, and monitors the temperature of one or more of the electronics of instrument 10 in operation.

The digital-to-analog converter 14 includes a loop drive circuit 32. Additionally, the loop drive circuitry 32 connects to a relay driver circuit 34, as illustrated. As described below, and particularly as described below in conjunction with FIG. 2, the relay driver circuit includes at least one relay, and preferably, a pair of relays, for providing a switching function in accordance with the principles of the present invention. As illustrated, the relay driver circuit 34 additionally connects directly with controller 12. As further illustrated, a power supply (not shown in FIG. 1) provides power to device 10 through a two-wire power loop, denoted generally by reference numeral 36. As shown, the two-wire power loop 36 has an input which inputs into the relay driver circuit 34, and a loop return which returns to monitoring components, such as a personal computer (not shown), a fixed resistance receiver such as a distributed control system (DCS), a programmable logic controller (PLC), digital indicator, or a recording device.

In operation, the pressure sensor 26 is placed within an environment in which sensing is desired. In particular, for example, the pressure sensor 26 is located in a line in which fluid flows, such that the sensor senses the pressure associated with the flowing of fluid. A signal indicative of the pressure of the fluid in which the pressure sensor 26 is placed is transmitted to the signal conditioning circuit 24, for conditioning the signal in accordance with known conditioning techniques. The condition signal is then sent to an analog-to-digital converter 18, where it is converted from an analog to digital state. The resulting signal is a digital signal indicative of the pressure sensed by pressure sensor 26 in the fluid environment in which the sensor is placed. The digital signal indicative of the sensed pressure is sent to controller 12.

Controller 12 receives the digital signal (e.g., the data) indicative of the pressure sensed by pressure sensor 26 and compares it with one or more threshold values stored in memory 16. In this regard, an operator of device 10 may utilize keypad input 22 to enter one or more threshold values. Accordingly, the controller 12 receives the data indicative of the then current pressure transmitted from pressure sensor 26, and compares the data with upper and lower thresholds stored in memory 16. Additionally, the controller. 12 transmits an output signal indicative of the sensed pressure to the digital-to-analog converter 14, at which the signal indicative of the sensed pressure is converted back to an analog signal. The analog signal is transmitted to loop drive circuit 32, where it is driven on the two-wire loop 36 back to a receiver (e.g, PC, PLC, etc.) component.

In accordance with a particular aspect of the present invention, the electrical components of system 10 require a particular amount of electrical power to operate. In particular, power is supplied to the device 10 via the two-wire loop. The supplied power preferably has an associated DC current at a selected value necessary to achieve the electrical power required by the components of device 10. In this regard, the system is further constructed and, particularly, is programmed via software and processed by controller 12, such that a selected range of electrical current magnitude is utilized as part of a transmission process of the present invention.

In particular, device 10 is preferably programmed and scaled such that the electrical components of the device 10 operate on approximately 3½ milliamps. Upon receipt by the controller 12 of data indicative of the pressure being sensed at pressure sensor 26, the controller 12 controls the electrical current flowing on two-wire power supply 36 so that the electrical current corresponds with the actual pressure then being sensed by pressure sensor 26. In particular, the controller 12 controls the loop drive circuit 32 to output an electrical current corresponding to the pressure level received by the controller 12 from pressure sensor 26. In this regard, the device 10 is scaled such that the current on loop 36 preferably operates within the range of 4 to 20 milliamps. In this regard, for example, controller 12 may be programmed such that the appearance of a 4 milliamp current on loop 36 is associated with a first, low pressure that may be sensed by pressure sensor 26, while a 20 milliamp magnitude is associated with a second, high pressure that may be sensed by pressure sensor 26. Thus, for example, utilizing input 22, the operator of device 10 may program controller 12 such that a lower threshold pressure level is associated with 4 milliamps, while an upper pressure threshold level is associated with 20 milliamps. It should be understood and appreciated that other values may be utilized. In this regard, for example, the device 10 may be scaled such that transmission outputs preferably vary within the range of 4–20 milliamps, while the upper and lower thresholds programmed via input 22 are something other than pressure levels associated with 4 and 20 milliamps. In normal operation, the output of the device is not less than 5% of the normal zero value of about 3.8 mA and not greater than 5% of the span value of about 21 mA. Generally, the zero output may be elevated to at least 10% or the upper range limit and the transmitter span lowered to at least 20% of the upper range limit to place the output safely within the 4 to 20 mA range.

Accordingly, upon receipt by controller 12 of data indicative of the pressure being sensed, the controller 12 determines the output necessary to achieve the corresponding current on the loop 36. Controller 12 may perform this operation by, for instance, utilizing an algorithm for making the output determination or, alternatively, once the scaling is completed, data indicative of a linear adjustment between the upper and lower threshold levels may be stored in memory corresponding to various pressures between the upper and lower thresholds (or between those pressures associated with 4 and 20 milliamps), respectively, such that the necessary information may simply be retrieved from the electronic table stored in memory 16.

Additionally, upon receipt of data indicative of the pressure being sensed by pressure sensor 26, the controller 12 outputs a signal to display 20 for displaying information regarding the then-sensed pressure. In this way, display 20 serves as a gauge for providing a visual indication to the operator of the currently sensed pressure.

The gauge of the present invention is not dependent on the scaling of the transmitter loop 36. Preferably, the gauge includes a micro power (e.g., below 2 mA) liquid crystal display (LCD) capable of continuous indication of the magnitude of the process variable to the number of significant digits consistent with the accuracy of sensor 26. The gauge preferably comprises a two-line 32 character alphanumeric liquid crystal display (LCD). The instrument 10 also includes a memory 16, which preferably includes a non-volatile memory providing storage of minimum and maximum process values accessible by the user and capable of being reset.

The gauge 26 continues to display the sensed process variable outside the normal operating range of the environment until the over-range of sensor 26 is exceeded. In the preferred embodiment, the gauge reads up to 150% of the upper range limit of sensor 26. Since the upper value displayed by the gauge is at the terminal point calibration of sensor 26, the set points/transmitter output calibrations are related to the indicated value, zero and span adjustments. Accordingly, these values may be provided to the user to allow bench calibration of the device.

Additionally, as indicated, the controller 12 compares the received data that is indicative of the currently sensed pressure with the upper and lower thresholds previously stored in memory 16. In accordance with an aspect of the invention, the lower threshold is associated with a first relay, while the upper threshold is associated with a second relay. When controller 12 determines that the pressure has fallen below the lower threshold, or has risen above the upper threshold, the controller 12 sends a signal to relay driver circuit 34 for activating the corresponding relay. Thus, for instance, when pressure levels in the line being sensed fall below a particular selected threshold level, or rises above an upper threshold limit, an alarm may be sounded, or some other process may be automatically initiated by the activation of the appropriate relay (discussed in detail with reference to FIG. 2, below).

Thus, upon change in status of each of relay outputs, a number of different responses may be initiated. For instance, the relay output may trigger a local control, provide an input for a more complex control device or sequence or merely give the user an indication of the contact status by activating indication lights or an alarm.

The relay outputs are programmable throughout the full operating range of sensor 26 and have an adjustable dead band up to 100% of the upper range limit (URL). The relays are scalable independently of the gauge or transmitter outputs. The relays are also programmable to fail-safe either opened or closed.

Accordingly, device 10 provides a combined switch, gauge, and transmitter that is powered by a common two-wired loop. Additionally, the device 10 provides a device in which a transmitter, for transmitting information indicative of a sensed pressure, transmits that information via the same two-wire power loop. Additionally, the device 10 provides a switch, a gauge, and a transmitter, each of which is independently scalable with respect to the other.

With additional reference now to FIG. 2, a block diagram illustrating the relay driver circuit 34 is illustrated, and it and its operation are described.

Relay driver circuit 34 has a voltage regulator 40, a first dual channel analog switch A, and is referenced by reference numeral 42, a second dual channel analog switch B, referenced by reference numeral 44, a first solid state relay 46, a second solid state relay 48, a default channel selector A 50, a default channel selector B 52, connected as illustrated. As illustrated, relays 46, 48 are connected in series. Relay, driver circuit 34 is utilized for activating relays 46, 48, and also for providing logic circuitry utilized in powering device 10. In particular, power is supplied to device 10, via relay driver circuit 34, from a loop power terminal, denoted by reference numeral 54. Loop power terminal 54 preferably provides DC power in the range of 18 to 30 volts. As illustrated, power is supplied to device 10 from the loop power terminal 54, via the two-wire loop 36. As illustrated, the two-wire loop 36 inputs into the first dual channel analog switch A 42. As illustrated, the dual channel analog switch A 42 has a first channel and a second channel. Upon start up of device 10, default channel selector 50 controls the dual channel analog switch 42 so that power is received via channel 2, in which case channel 1 is inoperative. Current flowing from the loop power 54 passes through channel 2 and enters the second dual channel analog switch B 44. In particular, upon initialization of the start up of device 10, default channel selector B associated with dual channel analog switch B 44 is similarly positioned to channel 12, such that power passes through the dual channel analog switch 44 via channel 2. Accordingly, as illustrated, upon start up of device 10, power passes through channel 2 of each of dual channel analog switch 42, 44, such that power does not pass through solid state relays 46, 48. Accordingly, power is provided to controller 12, and the various system components described above.

As device 10 operates, and the pressure sensor 26 senses pressure in the medium in which it is placed, the microcontroller compares data indicative of the sensed pressure with first and second threshold levels stored in memory 16 and associated with first and second relays 46, 48. As described, when one of the threshold conditions is met, the controller 12 transmits a signal to the relay driver to activate the appropriate relay. As illustrated in FIG. 2, this is accomplished by the controller 12 transmitting a signal back to the relay driver circuit 34 and, particularly, to the appropriate default channel selector 50, 52. For example, assuming that a threshold associated with solid state relay 46 is met, the controller transmits a signal to a corresponding relay channel selector 47 which causes the power transmitted on two-wire loop 36 to pass through channel 1, at which time channel 2 is shunted. Accordingly, upon activation of relay 1, channel selector 47 causes current to pass through channel 1 of the dual channel analog switch 42 to solid state relay 46, thereby switching the relay 46. As will be understood and appreciated, the relay 46 will be connected with an alarm, an indicator light, or with other instrumentation or equipment for initiating a process. In accordance with the invention, power is now transmitted through the solid state relay 46, through channel 2 of the dual channel analog switch 44, into the remainder of the components of device 10.

Accordingly, once a solid state relay 46, 48 has been activated, power is channeled through that relay to the components of device 10. Thus, as will now be appreciated, when a threshold associated with solid state relay 48 is reached, the controller 12 controls channel selector 49 for the purpose of selecting channel 1 of the dual channel analog switch 44, such that current now flows (from channel 2 of dual channel analog switch 42) to channel 1 of dual channel analog switch 44, thereby passing current to solid state relay 48. Thus, in addition to activating the relay 48, current now passes through the relay 48 for the purpose of powering the components of device 10.

Accordingly, in accordance with the principles of the present invention, current bypasses solid state relays 46, 48 until such time that it is necessary to trigger one of the relays 46, 48. It should, however, be understood and appreciated that device 10 can be constructed such that the relays 46, 48 and associated switches 42, 44 draw current from the system power supply as opposed to drawing from the loop power. In such an instance, appropriate signals may be transmitted to relay 46 or relay 48 when it is necessary to activate that relay. Such a construction is more desirable when the power drain through relays 46, 48 is nominal or minimal, such as would be the case when the relays 46, 48 have minimal power requirements. However, in those instances where it is desired to optimize utilization of power, and particularly in those instances in which the power drain associated with relays 46, 48 is greater than a selected amount, relay driver circuit 34 may be utilized to provide power to the components of device 10 in such a way that power passes through relay 46 or relay 48 only when necessary to activate the relay and, in which case, power is provided directly through the corresponding relay to the components of device 10.

Preferably, the components of the instrument 10 of the present invention, with the exception of the pressure sensor 26, process temperature sensor 28, and hardware temperature sensor 30 are housed within a small housing. In particular, the physical nature and dimensions of the housing are preferably tube-like, and are approximately 4.25"× 3.25"×2.25", at an external periphery of the housing. Thus, the housing occupies a volume of approximately no greater than 31 cubic inches.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A device comprising:
    a sensor for sensing a condition in an environment;
    a switch, wherein said switch is switched when said condition being sensed reaches a selected threshold;
    a two-wire loop power supply, wherein the two-wire loop power supply powers said sensor and said switch and comprises a transmitter for transmitting information indicative of that which is sensed by said sensor; and
    a controller, connected to said sensor, and powered by said two-wire loop power-supply, wherein said controller receives from said sensor, data indicative of that which is sensed at said sensor and controls an electrical current on said two-wire power supply loop to correspond with said received data.

2. The device as set forth in claim 1, wherein said controller in response to an increase in that which is sensed by said sensor correspondingly increases said electrical current and, in response to a decrease in that which is sensed by said sensor, correspondingly decreases said electrical current.

3. The device as set forth in claim 1, wherein said electrical current, when corresponding to a sensed condition, is generally within the range of 4–20 milliamps.

4. The device as set forth in claim 1, said device further comprising
    a gauge for displaying a readout indicative of that which is sensed by said sensor.

5. The device as set forth in claim 1, said device further comprising:
    a gauge for displaying a readout indicative of that which is sensed by said sensor, wherein each of said switch and said gauge are powered by said two-wire loop power supply.

6. The device as set forth in claim 5, wherein said switch, said transmitter, and said gauge are independently scalable.

7. The device as set forth in claim 1, wherein said controller processes said received data and causes said transmitter to transmit information indicative thereof within approximately 35 milliseconds.

8. The device as set forth in claim 1, wherein said controller processes said received data and causes said switches to switch within approximately 35 milliseconds.

9. The device as set forth in claim 7, wherein said controller is a microprocessor.

10. The device as set forth in claim 9, wherein said controller is a reduced instruction set microprocessor.

11. A device for sensing a condition in a process, said device comprising:
    a switch;
    a gauge;
    a transmitter, wherein each of said switch, said gauge, and said transmitter is powered by a common two-wire power supply loop, and wherein said transmitter comprises said two-wire power loop;
    a sensor; and
    a controller, wherein said sensor senses a condition in an environment in which said sensor is placed, and wherein said controller receives, from said sensor, data indicative of a sensed condition and controls an electrical current on said two-wire loop so that said electrical current corresponds to said sensed condition, thereby transmitting information regarding said sensed condition.

12. The device as set forth in claim 11, wherein said sensor, said gauge, and said controller consume less than 4 milliamps of electrical current, and wherein said electrical current on said loop corresponding to a sensed condition is generally within the range of 4–20 milliamps.

13. The device as set forth in claim 11, wherein said switch, said gauge, and said transmitter are independently scalable.

14. The device as set forth in claim 11, wherein said sensor is a pressure sensor.

15. The device as set forth in claim 14, wherein said pressure sensor is selected from the group consisting of a Wheatstone bridge strain gauge, a resonant wire sensor, a variable capacitance sensor, and a variable reluctance sensor.

16. The device as set forth in claim 11, wherein said sensor is a temperature sensor.

17. The device as set forth in claim 11, wherein said sensor is selected from the group consisting of a temperature sensor, a volumetric flow sensor, a level sensor, a differential pressure or differential temperature sensor.

18. The device as set forth in claim 11, wherein said sensor is selected from the group consisting of a thermocouple, an RTD sensor, a sensor comprising thermistors, an ultrasonic sensor, and a positive displacement sensor, a hydrostatic pressure sensor, a radio frequency capacitance sensor, and a radio frequency impedance sensor, a microwave radar sensor, and magnetostrictive sensor.

19. A device comprising:

a controller;

a sensor for sensing a variable in a process and for transmitting data indicative thereof to said controller;

a power supply having a two-wire loop for powering said controller and said sensor;

a relay, wherein said relay is activated when said variable sensed by said sensor reaches a selected threshold; and a logic circuit, wherein said logic circuit operates to provide power from said power supply to said controller and said sensor, but not to said relay, when said variable being sensed has not reached said selected threshold, and wherein said logic circuit operates to provide power to said controller and said sensor through said relay when said variable being sensed reaches said selected threshold.

20. The device as set forth in claim 19, further comprising a housing for housing said controller, said relay, and said logic circuit, wherein said housing has an exterior dimension comprising no greater than approximately 32 cubic inches.

* * * * *